United States Patent
Tsumagari et al.

(10) Patent No.: US 10,987,991 B2
(45) Date of Patent: Apr. 27, 2021

(54) AIR CONDITIONING UNIT FOR VEHICLE

(71) Applicant: DENSO CORPORATION, Kariya (JP)

(72) Inventors: Yuki Tsumagari, Kariya (JP); Ryo Kobayashi, Kariya (JP); Tetsuya Kono, Kariya (JP); Shinji Ide, Kariya (JP)

(73) Assignee: DENSO CORPORATION, Kariya (JP)

( * ) Notice: Subject to any disclaimer, the term of this patent is extended or adjusted under 35 U.S.C. 154(b) by 69 days.

(21) Appl. No.: 16/401,701

(22) Filed: May 2, 2019

(65) Prior Publication Data

US 2019/0255905 A1    Aug. 22, 2019

Related U.S. Application Data

(63) Continuation of application No. PCT/JP2017/036357, filed on Oct. 5, 2017.

(30) Foreign Application Priority Data

Nov. 7, 2016 (JP) .............................. JP2016-217470
Sep. 21, 2017 (JP) .............................. JP2017-181306

(51) Int. Cl.
   *B60H 3/00* (2006.01)
   *B60H 1/00* (2006.01)

(52) U.S. Cl.
   CPC .................... *B60H 1/00064* (2013.01); *B60H 2001/00164* (2013.01); *B60H 2001/00185* (2013.01)

(58) Field of Classification Search
   CPC ...... B60H 1/00064; B60H 2001/00164; B60H 2001/00185

USPC ............................................................ 165/42
See application file for complete search history.

(56) References Cited

U.S. PATENT DOCUMENTS

| 4,289,195 A | 9/1981 | Bellot et al. |
| 6,003,593 A | 12/1999 | Halligan |
| 2002/0117296 A1 | 8/2002 | Smith et al. |
| 2016/0236535 A1 | 8/2016 | Kuwayama et al. |
| 2017/0305230 A1* | 10/2017 | Sekito ................ B60H 1/00057 |

FOREIGN PATENT DOCUMENTS

| FR | 2789629 A1 | 8/2000 |
| JP | 2010100139 A | 5/2010 |
| JP | 2015080959 A | 4/2015 |

* cited by examiner

*Primary Examiner* — Davis D Hwu
(74) *Attorney, Agent, or Firm* — Harness, Dickey & Pierce, P.L.C.

(57) ABSTRACT

An air conditioning unit for a vehicle includes: an air conditioning case, a blower that draws air from an opening and blows the air radially outward from its rotation axis, a cooler disposed upstream of the blower, and a heater is disposed downstream of the blower. The air conditioning case includes an upper bypass passage through which the air bypasses the heater on an upper side of the heater, a lower bypass passage through which the air bypasses the heater on a lower side of the heater, a first opening provided downstream of the upper bypass passage, and a second opening provided downstream of the lower bypass passage. The opening of the blower faces an air outflow face of the cooler. A passage area of the upper bypass passage is larger than a passage area of the lower bypass passage.

9 Claims, 4 Drawing Sheets

AIR CONDITIONING UNIT FOR VEHICLE

CROSS REFERENCE TO RELATED APPLICATIONS

The present application is a continuation application of International Patent Application No. PCT/JP2017/036357 filed on Oct. 5, 2017, which designated the United States and claims the benefit of priority from Japanese Patent Application No. 2016-217470 filed on Nov. 7, 2016, and Japanese Patent Application No. 2017-181306 filed on Sep. 21, 2017. The entire disclosures of all of the above applications are incorporated herein by reference.

TECHNICAL FIELD

The present disclosure relates to an air conditioning unit for a vehicle.

BACKGROUND

Conventionally, an air conditioning unit for a vehicle includes a casing, a first centrifugal multi-blade fan that blows air into an upper air passage formed on an upper side in the casing, and a second centrifugal multi-blade fan that blows air into a lower air passage formed on a lower side in the casing.

SUMMARY

According to an aspect of the present disclosure, an air conditioning unit for a vehicle includes: an air conditioning case; a blower disposed in the air conditioning case and configured to draw air from an opening provided on one end side of the blower in a rotation axis of the blower and blow the air radially outward from the rotation axis; a cooler disposed upstream of the blower in an air flow direction and configured to cool the air flowing in the air conditioning case; and a heater disposed downstream of the blower in the air flow direction and configured to heat the air which has been cooled in the cooler. The air conditioning case includes an upper bypass passage through which the air blown out of the blower bypasses the heater on an upper side of the heater, a lower bypass passage through which the air bypasses the heater on a lower side of the heater, a first opening provided downstream of the upper bypass passage in the air flow direction, and a second opening provided downstream of the lower bypass passage in the air flow direction. The opening of the blower faces an air outflow face of the cooler. The heater is disposed in the air conditioning case such that a passage area of the upper bypass passage is larger than a passage area of the lower bypass passage.

DETAILED DESCRIPTION

Embodiments of the present disclosure will be described below based on the drawings. The same or equivalent parts in the following respective embodiments are provided with the same reference signs in the drawings.

First Embodiment

An air conditioning unit for a vehicle according to a first embodiment will be described with reference to FIGS. 1 to 3. Respective arrows indicating "up", "down", "left", "right", "front", and "rear" in the drawings show an up-down direction, a left-right direction, and a front-rear direction when the air conditioning unit for a vehicle is mounted on a vehicle.

Figure 1:
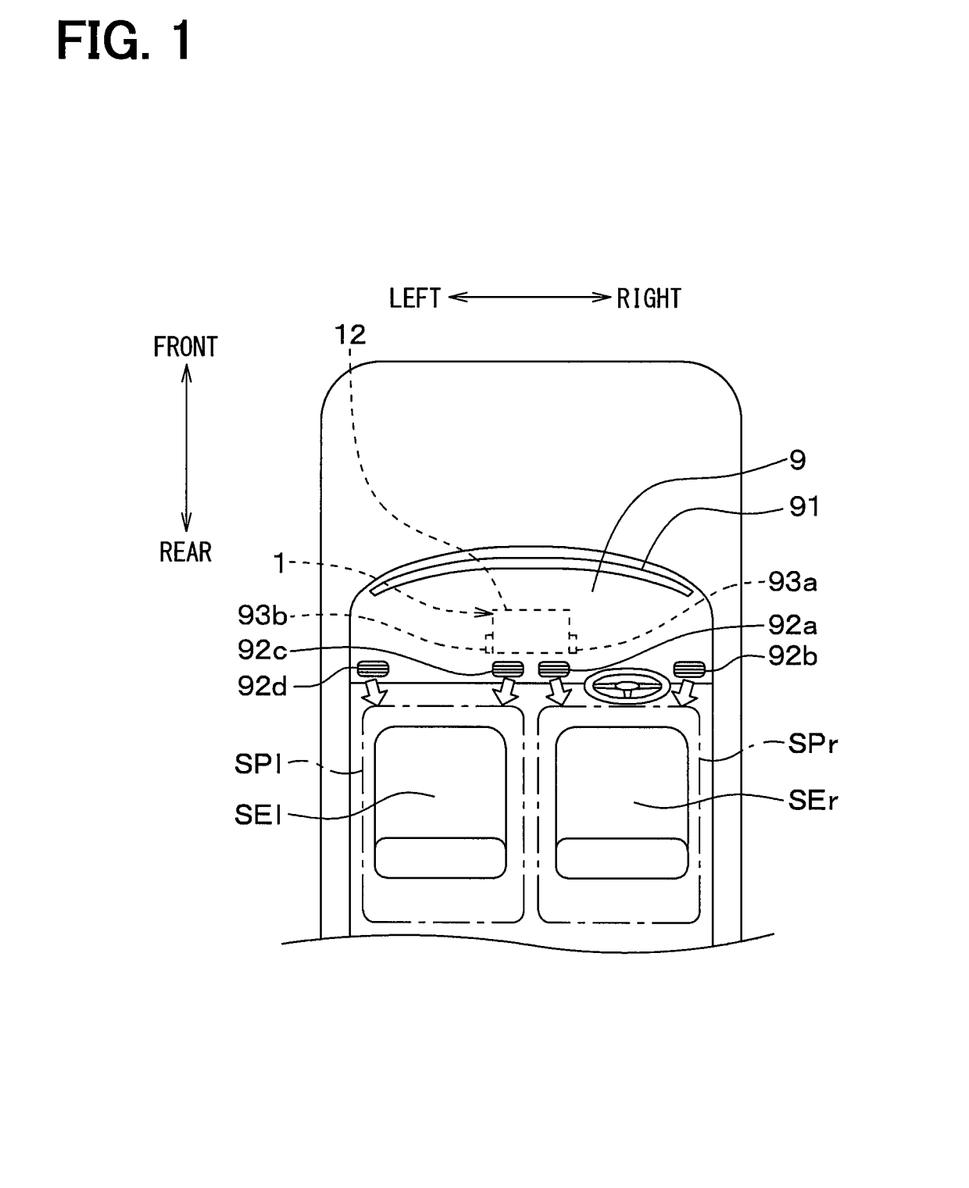
FIG. 1 is a schematic view illustrating an example of installing an air conditioning unit for a vehicle on a vehicle, according to a first embodiment.

As shown in FIG. 1, the air conditioning unit for a vehicle includes an air conditioning case 12 that adjusts air to be blown into a vehicle interior to a desired temperature. The air conditioning case 12 is disposed inside an instrument panel 9 provided in a forefront part in the vehicle interior.

The air conditioning case 12 is connected to a defroster blow outlet 91, face blow outlets 92a to 92d, and foot blow outlets 93a, 93b via ducts (not shown). The air conditioning case 12 can blow out the air adjusted to the desired temperature into the vehicle interior through the defroster blow outlet 91, the face blow outlets 92a to 92d, and the foot blow outlets 93a, 93b.

The defroster blow outlet 91 is a blow outlet that blows out the air, adjusted to the temperature in the air conditioning case 12, toward a vehicle windshield (not shown). The defroster blow outlet 91 is provided in a forefront part of the instrument panel 9.

The face blow outlets 92a to 92d are blow outlets that blow the air, adjusted to the temperature in the air conditioning case 12, toward faces of occupants sitting in front seats SEr, SEl in the vehicle interior. The face blow outlets 92a to 92d are provided behind the defroster blow outlet 91 on the instrument panel 9.

The foot blow outlets 93a, 93b are blow outlets that blow the air, adjusted to the temperature in the air conditioning case 12, toward lower bodies of the occupants sitting in the front seats SEr, SEl in the vehicle interior. The foot blow outlets 93a, 93b are open inside the instrument panel 9.

The foot blow outlets 93a, 93b in the present embodiment are a right foot blow outlet 93a that blows out the air mainly into a right space SPr in the vehicle interior and a left foot blow outlet 93b that blows out the air mainly into a left space SPl in the vehicle interior.

Figure 2:
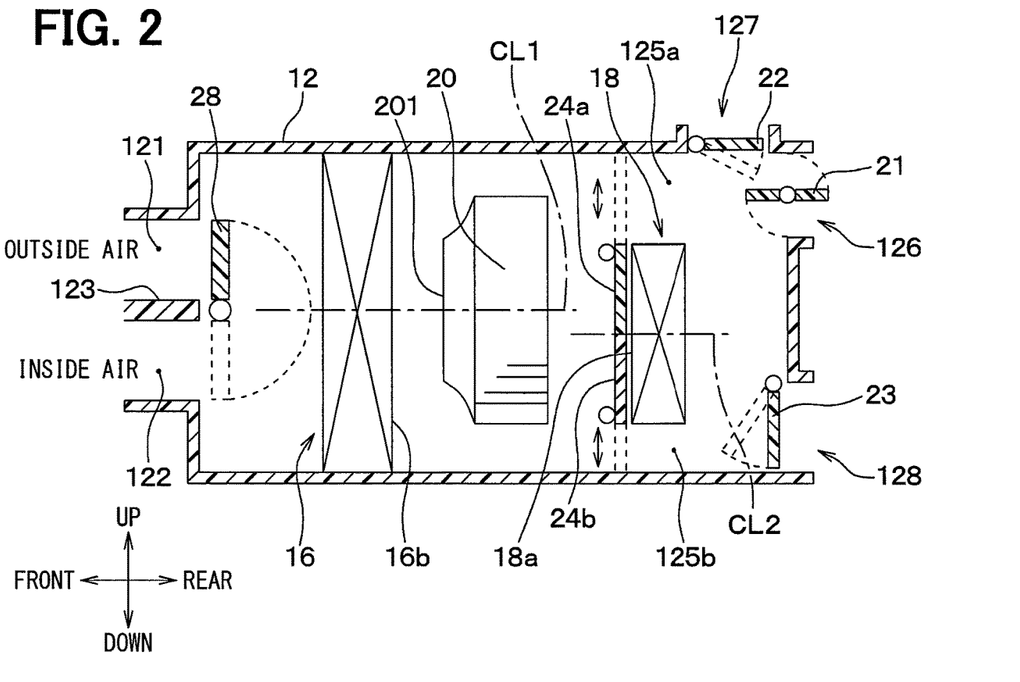
FIG. 2 is a sectional diagram illustrating a main structure of the air conditioning unit for a vehicle, according to the first embodiment.

FIG. 2 is a sectional view of a main structure of the air conditioning unit for a vehicle in the present embodiment. The air conditioning case 12 is a member that is made of resin and forms an outer shell of the air conditioning unit for a vehicle. FIG. 1 shows a main part of the entire air conditioning case 12.

The air conditioning case 12 has a partition wall 123 that separates an outside air introducing port 121 for introducing outside air which is air outside the vehicle interior and an inside air introducing port 122 for introducing inside air which is air inside the vehicle interior from each other. The outside air which is the air outside the vehicle interior or the inside air which is the air inside the vehicle interior is introduced by a blower 20 into the air conditioning case 12. The outside air or the inside air introduced into the air conditioning case 12 flows into an evaporator 16.

The evaporator 16 is a cooling heat exchanger, i.e., a cooler that cools the air flowing through the air conditioning case 12. The evaporator 16 is housed in the air conditioning case 12 and disposed so that the outside air or the inside air introduced into the air conditioning case 12 flows into the evaporator 16. The evaporator 16 forms a known refrigeration cycle device, through which refrigerant circulates, together with a compressor, a condenser, and an expansion valve (not shown). The evaporator 16 cools the air passing through the evaporator 16 by evaporation of the refrigerant.

The blower 20 is a centrifugal blower that draws in the air, introduced into the inside air introducing port 122 or the outside air introducing port 121, from an opening 201 provided on one end side of a rotation axis CL1 and blows the air outward in a radial direction of the rotation axis CL1. The blower 20 is disposed on a downstream side of the evaporator 16 in an air flow direction, which is what is called a suction layout. The blower 20 draws in the air from the opening 201 as shown by arrows FL1 in FIG. 3 and blows the air outward in the radial direction of the rotation axis CL1 as shown by arrows FL2, FL3.

The blower 20 is disposed so that the opening 201 of the blower 20 faces an air outflow face 16b of the evaporator 16. The blower 20 is disposed so that the rotation axis CL1 of the blower 20 is substantially orthogonal to the air outflow face 16b of the evaporator 16.

The heater core 18 is disposed on a downstream side of the evaporator 16 in the air flow direction in the air conditioning case 12. The heater core 18 is disposed at a center in the up-down direction in the air conditioning case 12. The heater core 18 is in such a size as to be concealed in the up-down direction by a projection of the blower 20 in a direction from the air outflow face 16b of the evaporator 16 toward the heater core 18. The heater core 18 is for heating the air flowing out of the evaporator 16 with engine cooling water which is warm water, i.e., a heater. An upper bypass passage 125a is formed above the heater core 18 and a lower bypass passage 125b is formed below the heater core 18. In other words, the air conditioning case 12 has the upper bypass passage 125a that allows the air flowing out of the evaporator 16 to detour over the heater core 18 and the lower bypass passage 125b that allows the air to detour under the heater core 18. Between the heater core 18 and the evaporator 16, a first air mix door 24a and a second air mix door 24b are provided.

The first air mix door 24a is disposed in the upper bypass passage 125a. The first air mix door 24a is a sliding door mechanism and slid by an electric actuator (not shown).

The first air mix door 24a adjusts a ratio between a volume of air passing through the heater core 18 and a volume of air passing through the upper bypass passage 125a detouring over the heater core 18 in the air conditioning case 12 with its sliding position.

The second air mix door 24b is disposed in the lower bypass passage 125b. The second air mix door 24b is a sliding door mechanism and slid by an electric actuator (not shown).

The second air mix door 24b adjusts a ratio between a volume of air passing through the heater core 18 and a volume of air passing through the lower bypass passage 125b detouring under the heater core 18 in the air conditioning case 12 with its sliding position.

On a downstream side of the heater core 18 in the air flow direction, warm air passing through the heater core 18 and cold air passing through the upper bypass passage 125a are mixed. When a face switching door 21 is open and therefore a face opening 126 is open, the mixed air is introduced into the vehicle interior mainly from the face opening 126 through the face blow outlets 92a to 92d. When a defroster switching door 22 is open and therefore a defroster opening 127 is open, the mixed air is introduced into the vehicle interior mainly from the defroster opening 127 through the defroster blow outlet 91. Therefore, the air flowing on the downstream side of the heater core 18 in the air flow direction has its temperature adjusted according to the sliding position of the first air mix door 24a and is blown out into the vehicle interior.

The second air mix door 24b is disposed in the lower bypass passage 125b. The second air mix door 24b is the sliding door mechanism similar to the first air mix door 24a and slid by the electric actuator (not shown).

The second air mix door 24b adjusts the ratio between the volume of air passing through the heater core 18 and the volume of air passing through the lower bypass passage 125b detouring under the heater core 18 in the air conditioning case 12 with its sliding position.

On the downstream side of the heater core 18 in the air flow direction, warm air passing through the heater core 18 and cold air passing through the lower bypass passage 125b are mixed. When a foot switching door 23 is open and therefore a foot opening 128 is open, the mixed air is introduced into the vehicle interior mainly from the foot opening 128 through the foot blow outlet 93a. Therefore, the air flowing on the downstream side of the heater core 18 in the air flow direction has its temperature adjusted according to the sliding position of the second air mix door 24b and is blown out into the vehicle interior.

Next, operation of the present air conditioning unit for a vehicle will be described. If the blower 20 starts operating, air is introduced into the air conditioning case 12 through the outside air introducing port 121 or the inside air introducing port 122. The air introduced into the air conditioning case 12 passes through the evaporator 16 and exchanges heat with the evaporator 16 to thereby be cooled.

The air cooled in the evaporator 16 is drawn into the opening 201 of the blower 20 and blown outward in the radial direction of the rotation axis CL1 of the blower 20.

The air blown out of the blower 20 passes through the heater core 18, the upper bypass passage 125a, and the lower bypass passage 125b, respectively, and the flows of air are mixed on the downstream side of the heater core 18 in the air flow direction.

According to the sliding position of the first air mix door 24, the ratio between the volume of air passing through the heater core 18 and the volume of air passing through the upper bypass passage 125a detouring over the heater core 18 in the air conditioning case 12 is adjusted.

Then, the air at the adjusted air volume ratio is blown out into the vehicle interior mainly from the face opening 126 through the face blow outlets 92a to 92d and introduced into the vehicle interior from the defroster opening 127 through the defroster blow outlet 91.

According to the sliding position of the second air mix door 24b, the ratio between the volume of air passing through the heater core 18 and the volume of air passing through the lower bypass passage 125b detouring under the heater core 18 in the air conditioning case 12 is adjusted. Then, the air at the adjusted air volume ratio is introduced into the vehicle interior mainly from the foot opening 128 through the foot blow outlets 93a, 93b.

The heater core 18 is disposed in the air conditioning case 12 so that the upper bypass passage 125a has a larger passage area than the lower bypass passage 125b. Therefore, a larger volume of air is blown out of the air conditioning case through the upper bypass passage 125a than in the case where the upper bypass passage 125a has an equal passage area to the lower bypass passage 125b. In this way, it is possible to blow a sufficient flow rate of air toward the faces of the occupants in the vehicle interior.

Then, parts of the air passing through the lower bypass passage 125b are blown out into the vehicle interior from the face opening 126 through the face blow outlets 92a to 92d and blown out into the vehicle interior from the defroster opening 127 through the defroster blow outlet 91.

As described above, the present air conditioning unit for a vehicle includes the air conditioning case 12 and the blower 20 that is disposed in the air conditioning case 12 and blows the air, drawn from the opening 201 provided on the one end side of the rotation axis CL1, outward in the radial direction of the rotation axis CL1.

The air conditioning unit for a vehicle further includes the evaporator 16 that is disposed on an upstream side of the blower 20 in the air flow direction and cools the air flowing through the air conditioning case 12 and the heater core 18 that is disposed on the downstream side of the blower 20 in the air flow direction and heats the air cooled in the evaporator 16.

The air conditioning case 12 has the upper bypass passage 125a that allows the air blown out of the blower 20 to detour over the heater core 18 and the lower bypass passage 125b that allows the air to detour under the heater core 18. The air conditioning case 12 further includes the first opening 126 that is formed on a downstream side of the upper bypass passage 125a in the air flow direction and the second opening 128 that is formed on a downstream side of the lower bypass passage 125b in the air flow direction.

The blower 20 is disposed so that the opening 201 faces the air outflow face 16b of the evaporator 16 and the heater core 18 is disposed in the air conditioning case so that the upper bypass passage 125a has the larger passage area than the lower bypass passage 125b.

The air conditioning unit for a vehicle includes the blower 20 that blows the air, drawn from the opening 201 provided on the one end side of the rotation axis CL1, outward in the radial direction of the rotation axis CL1 and the blower 20 is disposed so that the opening 201 faces the air outflow face 16b of the evaporator 16. Therefore, it is possible to reduce a length of the cooler in a direction orthogonal to the air outflow face in the air conditioning unit to thereby miniaturize the air conditioning case. It is possible to achieve what is called a centered layout in which the air conditioning unit for a vehicle is disposed at a center in the left-right direction of the vehicle.

Moreover, since the heater core 18 is disposed in the air conditioning case 12 so that the upper bypass passage 125a has the larger passage area than the lower bypass passage 125b, it is possible to increase the volume of air blown out of the air conditioning case 12 through the upper bypass passage 125a.

In a structure with an evaporator 16 disposed on a downstream side of a blower 20 in an air flow direction, the evaporator 16 creates a ventilation resistance. However, in the present embodiment, the blower 20 is disposed on the downstream side of the evaporator 16 in the air flow direction. In this way, it is possible to introduce the air blown out of the blower 20 as it is into the face opening 126 through the upper bypass passage 125a. Therefore, it is possible to further increase the volume of air blown out of the air conditioning case 12 through the upper bypass passage 125a.

The heater core 18 is disposed so that a center of an air inflow face 18a into which the air flows is at a position lower than a center of the air outflow face 16b of the evaporator 16. By disposing the center of the air inflow face 18a of the heater core 18 at the position lower than the center of the air outflow face 16b of the evaporator 16, it is possible to make the passage area of the upper bypass passage 125a larger than the passage area of the lower bypass passage 125b.

The heater core 18 is disposed so that the center of the air inflow face 18a of the heater core 18 is at the position lower than the rotation axis CL1 of the blower 20. By disposing the center of the air inflow face 18a of the heater core 18 at the position lower than the rotation axis CL1 of the blower 20, it is possible to make the passage area of the upper bypass passage 125a larger than the passage area of the lower bypass passage 125b.

The face opening 126 communicating with the face blow outlets 92a to 92d that blow the air toward the faces of the occupants in the vehicle interior can serve as the first opening. The foot opening 128 communicating with the foot blow outlets 93a, 93b that blow the air toward the feet of the occupants in the vehicle interior can serve as the second opening.

The blower 20 in the present embodiment blows the air, drawn from the opening 201 provided on the one end side of the rotation axis CL1, outward in the radial direction of the rotation axis CL1. If the opening 201 of the blower 20 is disposed to face the air outflow face 16b of the cooler as in the present embodiment, the air blown out of the blower 20 hits an inner wall of the air conditioning case 12 as shown in FIG. 3. Then, the air turns in an axial direction of the rotation axis CL1 of the blower 20 and is blown out into the vehicle interior from the first and second openings 126, 128.

Figure 3:
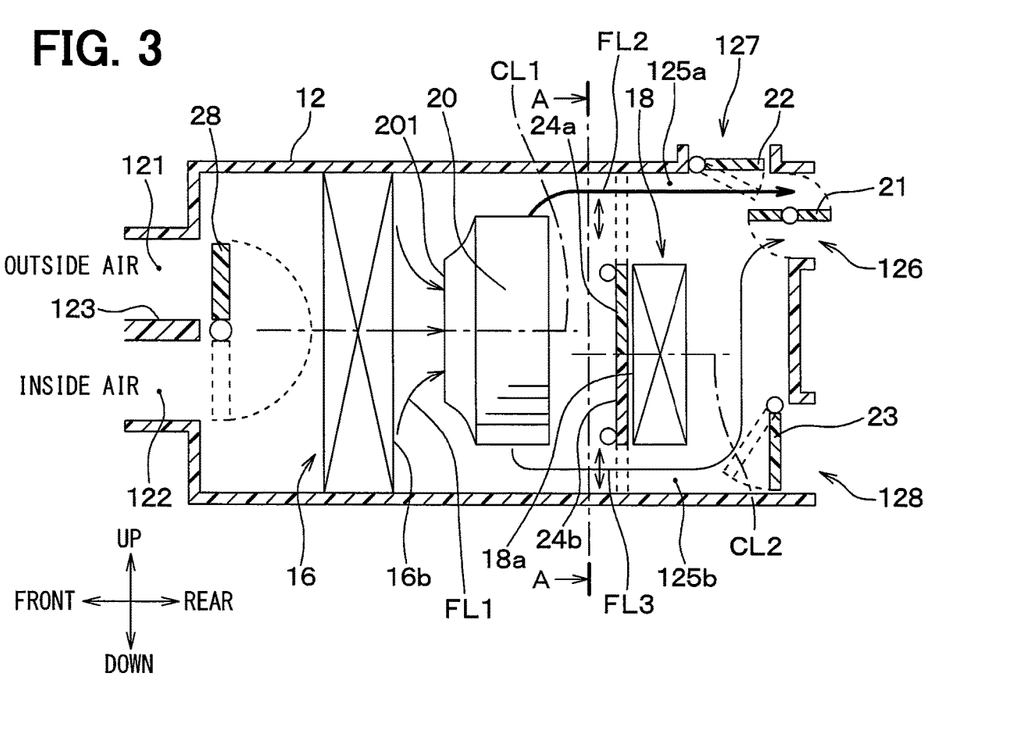
FIG. 3 is a diagram illustrating air flows in the air conditioning unit for a vehicle, according to the first embodiment.

Therefore, a flow rate of the air flowing through the air conditioning case 12 is high on the upper side on the downstream side of the blower 20 in the air flow direction, i.e., at a position of the upper bypass passage 125a and on the lower side on the downstream side of the blower 20 in the air flow direction, i.e., at a position of the lower bypass passage 125b in a section taken along line A-A in FIG. 3. The flow rate of the air is low at a center on the downstream side of the blower 20 in the air flow direction.

Since the heater core 18 in the present embodiment is disposed at the center of the air conditioning case 12 in the up-down direction where the flow rate of the air flowing through the air conditioning case 12 is relatively low, it is possible to suppress a pressure loss in the flow path. Therefore, it is possible to blow out a large volume of air into the vehicle interior in maximum cooling that requires a largest volume of air, for example.

In the present embodiment, the heater core 18 is in such a size as to be concealed in the up-down direction by the projection of the blower 20 in the direction from the air outflow face 16b of the evaporator 16 toward the heater core 18. Therefore, it is possible to suppress a pressure loss in the flow path as compared with the case where the heater core 18 is in such a size as not to be concealed by the projection of the blower 20.

Second Embodiment

Figure 4:
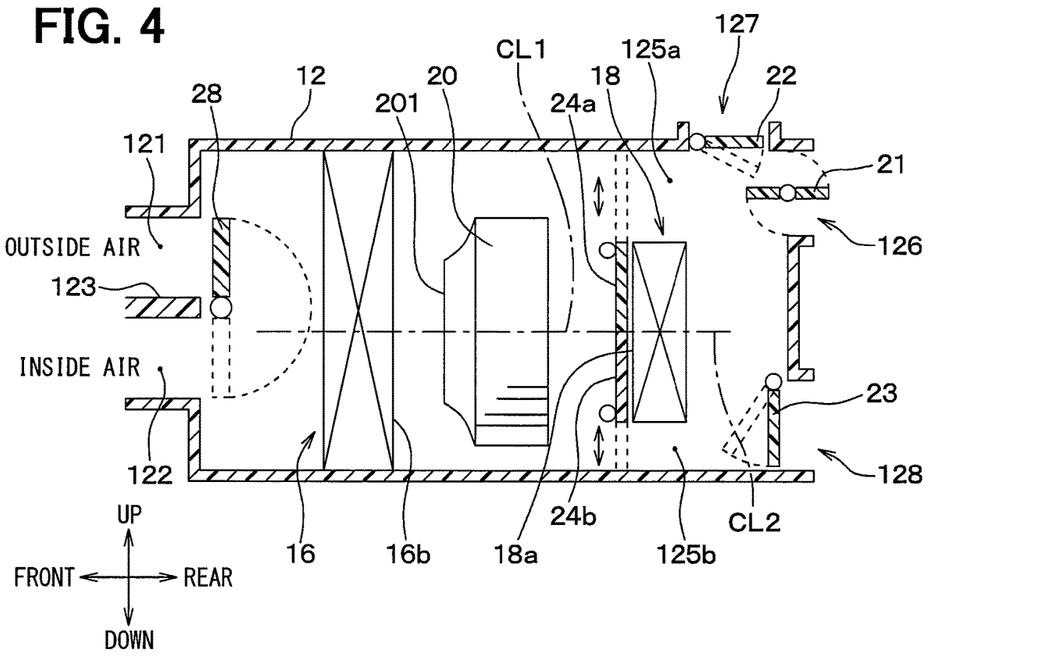
FIG. 4 is a sectional diagram illustrating a main structure of an air conditioning unit for a vehicle, according to a second embodiment.

An air conditioning unit for a vehicle according to a second embodiment will be described with reference to FIG.

4. In the air conditioning unit for a vehicle in the above-described first embodiment, the heater core 18 is disposed so that the center of the air inflow face 18a of the heater core 18 is at the position lower than the center of the air outflow face 16b of the evaporator 16 and the rotation axis CL1 of the blower 20. On the other hand, in the air conditioning unit for a vehicle in the present embodiment, a heater core 18 is disposed so that a center of an air inflow face 18a of a heater core 18 and a rotation axis CL1 of a blower 20 are at positions lower than a center of an air outflow face 16b of an evaporator 16.

Therefore, it is possible to make a passage area of an upper bypass passage 125a larger than a passage area of a lower bypass passage 125b.

With this structure, it is possible to make a volume of air flowing through the upper bypass passage 125a larger than in a case where the rotation axis CL1 of the blower 20 is aligned with the center of the air outflow face 16b of the evaporator 16.

In the present embodiment, as in the above-described first embodiment, it is possible to obtain effects exerted by the same structures as those in the first embodiment.

Third Embodiment

Figure 5:
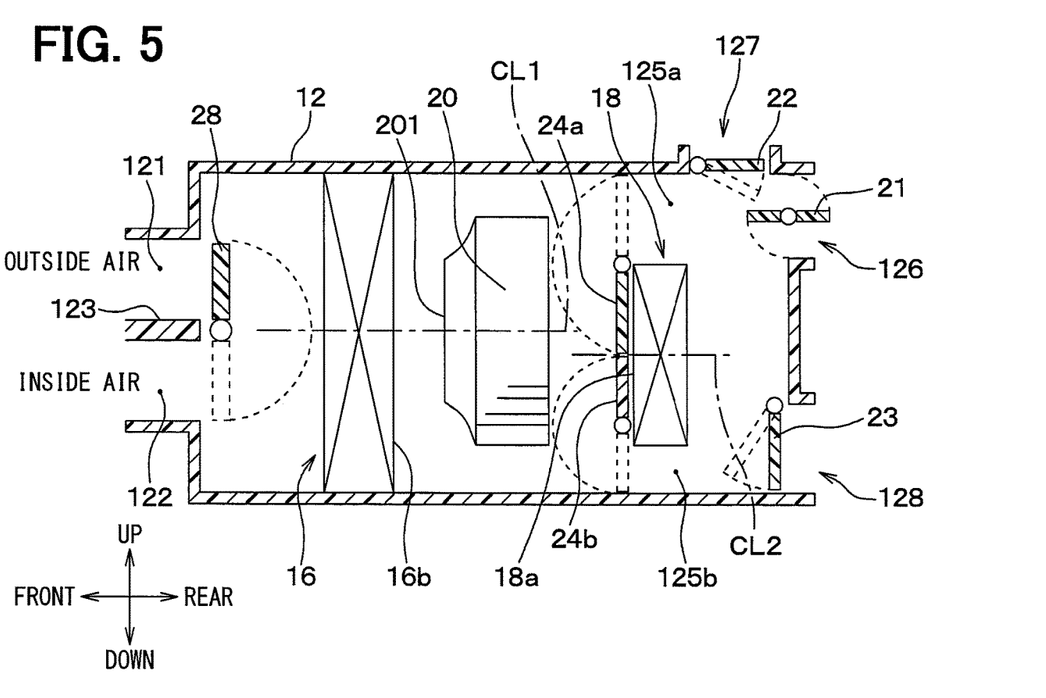
FIG. 5 is a sectional diagram illustrating a main structure of an air conditioning unit for a vehicle, according to a third embodiment.

An air conditioning unit for a vehicle according to a third embodiment will be described with reference to FIG. 5. In the air conditioning unit for a vehicle in the above-described first embodiment, the first and second air mix doors 24a, 24b are formed by the sliding door mechanisms. On the other hand, in the air conditioning unit for a vehicle in the present embodiment, first and second air mix doors 24a, 24b are formed by rotary doors. In this manner, the first and second air mix doors 24a, 24b may be formed by the rotary doors.

In the present embodiment, as in the above-described first embodiment, it is possible to obtain effects exerted by the same structures as those in the first embodiment.

Fourth Embodiment

Figure 6:
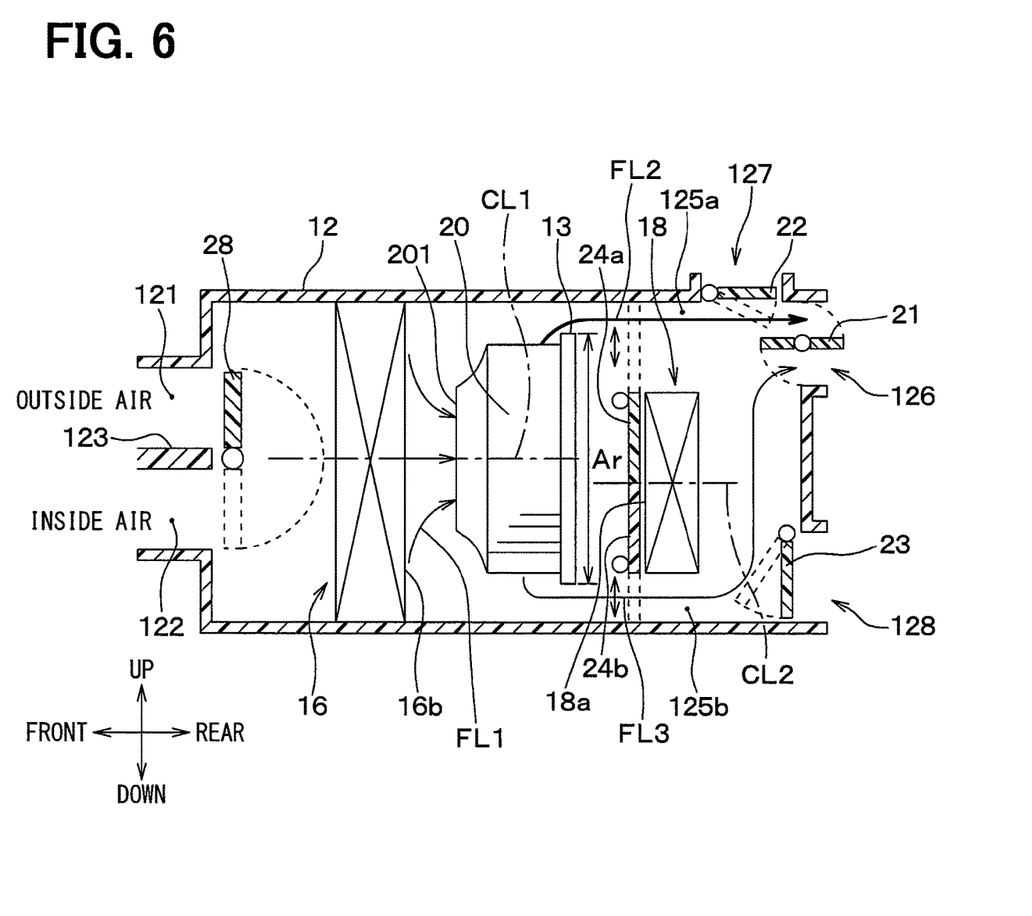
FIG. 6 is a sectional diagram illustrating a main structure of an air conditioning unit for a vehicle, according to a fourth embodiment.

An air conditioning unit for a vehicle according to a fourth embodiment will be described with reference to FIG. 6. The air conditioning unit for a vehicle in the present embodiment is different from the air conditioning unit for a vehicle in the above-described first embodiment in that the air conditioning unit for a vehicle in the present embodiment further includes a dividing member 13.

The dividing member 13 is disposed on a downstream side of a blower 20 in an air flow direction and on an upstream side of a heater core 18 in the air flow direction. The dividing member 13 divides an upper bypass passage 125a and a lower bypass passage 125b from each other and supports the blower 20 from the downstream side of the blower 20 in the air flow direction. The dividing member 13 is formed by a member having a plate shape.

An upper end of the dividing member 13 in the present embodiment protrudes upward from an upper end of the blower 20 and a lower end of the dividing member 13 protrudes downward from a lower end of the blower 20.

The heater core 18 is disposed within a predetermined area Ar between the upper end and the lower end of the dividing member 13.

In this manner, the air conditioning unit for a vehicle in the present embodiment includes the dividing member 13 that divides the upper bypass passage 125a and the lower bypass passage 125b from each other. The heater core 18 is positioned within the predetermined area Ar between the upper end and the lower end of the dividing member 13.

Since the heater core 18 is positioned within the predetermined area Ar between the upper end and the lower end of the dividing member 13 where a flow rate of air flowing through an air conditioning case 12 is relatively low, it is possible to suppress a pressure loss in the air conditioning case 12.

Other Embodiments (1) Although the blower 20 is disposed so that the rotation axis CL1 of the blower 20 is substantially orthogonal to the air outflow face 16b of the evaporator 16 in each of the above-described respective embodiments, a blower 20 may be disposed obliquely so that a rotation axis CL1 of the blower 20 crosses an air outflow face 16b of an evaporator 16.

(2) In each of the above-described embodiments, the centrifugal blower that blows the air, drawn from the one end side of the axial direction of the rotation axis CL1, outward in the radial direction of the rotation axis CL1 is employed. However, it is also possible to employ a mixed flow blower that blows air, drawn from one end side in an axial direction of a rotation axis CL1, in oblique directions with respect to the rotation axis CL1.

The present disclosure is not limited to the above-described embodiments and may be changed where necessary. The above-described respective embodiments are not unrelated to each other and may be suitably combined with each other unless the combination is obviously impossible. In each of the above-described embodiments, it is needless to say that the components forming the embodiment are not necessarily essential unless the components are especially and clearly described as essential or obviously considered to be essential in principle. In each of the above-described embodiments, if numerical values such as the numbers of components forming the embodiment, numerical values, amounts, and ranges are mentioned, the numerical values are not unchangeable unless the numerical values are especially and clearly described as essential or the specific numerical values are obviously unchangeable in principle.

In each of the above-described embodiments, if materials, shapes, positional relationships, and the like of the components and the like are mentioned, the materials, the shapes, the positional relationships, and the like are not unchangeable unless otherwise specified or the specific materials, shapes, positional relationships, and the like are obviously unchangeable in principle.

(Overview)

According to first to third aspects shown in a part or whole of the above-described respective embodiments, the air conditioning unit includes the air conditioning case 12 and the blower 20 disposed in the air conditioning case 12. The blower 20 draws air from the opening 201 provided on one end side of the blower 20 in the rotation axis CL1 of the blower and blows the air radially outward from the rotation axis CL1.

The air conditioning unit further includes the evaporator 16 that is disposed upstream of the blower 20 in an air flow direction and cools the air flowing in the air conditioning case 12, and the heater core 18 that is disposed downstream of the blower 20 in the air flow direction and heats the air which has been cooled in the evaporator 16.

The air conditioning case 12 includes the upper bypass passage 125a through which the air blown out of the blower 20 bypasses the heater core 18 on the upper side of the heater core 18, and the lower bypass passage 125b through which the air bypasses the heater core 18 on the lower side of the heater core 18. The air conditioning case 12 further includes the first opening 126 provided downstream of the upper bypass passage 125a in the air flow direction, and the second opening 128 provided downstream of the lower bypass passage 125b in the air flow direction.

The opening 201 of the blower 20 faces the air outflow face 16b of the evaporator 16, and the heater core 18 is disposed in the air conditioning case such that a passage area of the upper bypass passage 125a is larger than a passage area of the lower bypass passage 125b.

According to second and fourth aspects, the center of the air inflow face 18a of the heater core 18 through which the air flows into the heater core 18 is lower than the center of the air outflow face 16b of the evaporator 16. By disposing the center of the air inflow face 18a of the heater core 18 at the position lower than the center of the air outflow face 16b of the evaporator 16, it is possible to make the passage area of the upper bypass passage 125a larger than the passage area of the lower bypass passage 125b.

According to a third aspect, the center of the air inflow face 18a of the heater core 18 is lower than the rotation axis CL1 of the blower 20. By disposing the center of the air inflow face 18 at the position lower than the rotation axis CL1 of the blower 20, it is possible to make the passage area of the upper bypass passage 125a larger than the passage area of the lower bypass passage 125b.

According to a fifth aspect, the blower 20 is a centrifugal blower or a mixed flow blower.

According to a sixth aspect, the air conditioning unit includes the dividing member that is disposed downstream of the blower in the air flow direction and upstream of the heater in the air flow direction and divides the upper bypass passage and the lower bypass passage. The heater is disposed within the predetermined area between the upper end and the lower end of the dividing member.

Since the heater is disposed to be positioned in the predetermined area between the upper end and the lower end of the dividing member where the flow rate of air flowing through the air conditioning case is relatively low, it is possible to reduce the pressure loss in the air conditioning case.

According to a seventh aspect, the heater has a size in an up-down direction to be concealed by the blower when the heater is viewed from the air outflow face of the cooler. Therefore, it is possible to reduce the pressure loss in the flow path as compared with the case where the heater has a size not to be concealed by the blower.

According to an eighth aspect, the first opening is a face opening 126 that communicates with a face blow outlet 92a, 92b, 92c, 92d through which the air is blown toward a face of an occupant in a vehicle interior. In this manner, the first opening can be the face opening 126.

According to ninth aspect, the second opening is a foot opening 128 that communicates with a foot blow outlet 93a, 93b through which the air is blown toward a foot of an occupant in a vehicle interior. In this manner, the second blow outlet can be the foot opening 128.

Comparative Example

A comparative example will be described below. An air conditioning unit for a vehicle of the comparative example includes a casing, a first centrifugal multi-blade fan that blows air into an upper air passage formed on an upper side in the casing, and a second centrifugal multi-blade fan that blows air into a lower air passage formed on a lower side in the casing. The air conditioning unit further includes a cooling heat exchanger disposed to extend across the upper air passage and the lower air passage, and a heating heat exchanger that is disposed on a downstream side of the cooling heat exchanger in an air flow direction. Bypass passages that bypass the heating heat exchanger are formed above and below the heating heat exchanger.

The upper and lower bypass passages in the air conditioning unit have substantially the same passage areas. Therefore it is difficult to increase a difference between a volume of air flowing through the upper bypass passage and a volume of air flowing through the lower bypass passage. It is impossible to blow a sufficient flow rate of air from the upper bypass passage through a blow outlet toward a face of an occupant in a vehicle interior, for example.

Moreover, in the air conditioning unit in which the first and second centrifugal multi-blade fans blow the air to the cooling heat exchanger, the first and second centrifugal multi-blade fans are disposed so that rotation axes of the first and second centrifugal multi-blade fans are substantially parallel to an air inflow face of the cooling heat exchanger. In this air conditioning unit, fans having large radial dimensions are used in order to increase volumes of blown air.

Therefore, according to a study by the inventor, a length of the cooling heat exchanger in a direction orthogonal to the air inflow face in the air conditioning unit becomes long, which increases a size of the air conditioning case.

As compared to the air conditioning unit of the comparative example, an air conditioning unit of the present disclosure miniaturizes an air conditioning case and increases a flow rate of air blown out of an air conditioning case through an upper bypass passage.

According to an aspect of the present disclosure, an air conditioning unit for a vehicle includes: an air conditioning case; a blower disposed in the air conditioning case and configured to draw air from an opening provided on one end side of the blower in a rotation axis of the blower and blow the air radially outward from the rotation axis; a cooler disposed upstream of the blower in an air flow direction and configured to cool the air flowing in the air conditioning case; and a heater disposed downstream of the blower in the air flow direction and configured to heat the air which has been cooled in the cooler. The air conditioning case includes an upper bypass passage through which the air blown out of the blower bypasses the heater on an upper side of the heater, a lower bypass passage through which the air bypasses the heater on a lower side of the heater, a first opening provided downstream of the upper bypass passage in the air flow direction, and a second opening provided downstream of the lower bypass passage in the air flow direction. The opening of the blower faces an air outflow face of the cooler. The heater is disposed in the air conditioning case such that a passage area of the upper bypass passage is larger than a passage area of the lower bypass passage.

In this structure, the air conditioning unit for a vehicle includes the blower that draws from the opening provided on the one end side of the blower in the rotation axis and blows the air radially outward from the rotation axis. Further, the opening of the blower faces the air outflow face of the cooler. Therefore, it is possible to reduce a length of the cooler in a direction orthogonal to the air outflow face in the air conditioning unit, and thereby the air conditioning case can be miniaturized. Moreover, the heater is disposed in the air conditioning case so that the passage area of the upper bypass passage is larger than the passage area of the lower bypass passage. Therefore, it is possible to increase the flow rate of air blown out of the air conditioning case through the upper bypass passage.

What is claimed is:

1. An air conditioning unit for a vehicle, comprising:
an air conditioning case;
a blower disposed in the air conditioning case and configured to draw air from an opening provided on one end side of the blower in a rotation axis of the blower and blow the air radially outward from the rotation axis;
a cooler disposed upstream of the blower in an air flow direction and configured to cool the air flowing in the air conditioning case; and
a heater disposed downstream of the blower in the air flow direction and configured to heat the air which has been cooled in the cooler,
wherein:
the air conditioning case includes an upper bypass passage through which the air blown out of the blower bypasses the heater on an upper side of the heater, a lower bypass passage through which the air bypasses the heater on a lower side of the heater, a first opening provided downstream of the upper bypass passage in the air flow direction, and a second opening provided downstream of the lower bypass passage in the air flow direction;
the opening of the blower faces an air outflow face of the cooler; and
the heater is disposed in the air conditioning case such that a passage area of the upper bypass passage is larger than a passage area of the lower bypass passage.

2. An air conditioning unit for a vehicle, comprising:
an air conditioning case;
a blower disposed in the air conditioning case and configured to draw air from an opening provided on one end side of the blower in a rotation axis of the blower and blow air radially outward from the rotation axis;
a cooler disposed upstream of the blower in an air flow direction and configured to cool the air flowing in the air conditioning case; and
a heater disposed downstream of the blower in the air flow direction and configured to heat the air which has been cooled in the cooler,
wherein:
the air conditioning case includes an upper bypass passage through which the air blown out of the blower bypasses the heater on an upper side of the heater, a lower bypass passage through which the air bypasses the heater on a lower side of the heater, a first opening provided downstream of the upper bypass passage in the air flow direction, and a second opening provided downstream of the lower bypass passage in the air flow direction;
the opening of the blower faces an air outflow face of the cooler;
the heater is disposed in the air conditioning case such that a passage area of the upper bypass passage is larger than a passage area of the lower bypass passage; and
a center of an air inflow face of the heater through which the air flows into the heater is lower than a center of the air outflow face of the cooler.

3. An air conditioning unit for a vehicle, comprising:
an air conditioning case;
a blower disposed in the air conditioning case and configured to draw air from an opening provided on one end side of the blower in a rotation axis of the blower and blow the air radially outward from the rotation axis;
a cooler disposed upstream of the blower in an air flow direction and configured to cool the air flowing in the air conditioning case; and
a heater disposed downstream of the blower in the air flow direction and configured to heat the air which has been cooled in the cooler,
wherein:
the air conditioning case includes an upper bypass passage through which the air blown out of the blower bypasses the heater on an upper side of the heater, a lower bypass passage through which the air bypasses the heater on a lower side of the heater, a first opening provided downstream of the upper bypass passage in the air flow direction, and a second opening provided downstream of the lower bypass passage in the air flow direction;
the opening of the blower faces an air outflow face of the cooler;
the heater is disposed in the air conditioning case such that a passage area of the upper bypass passage is larger than a passage area of the lower bypass passage; and
a center of an air inflow face of the heater is lower than the rotation axis of the blower.

4. The air conditioning unit according to claim 3, wherein the center of the air inflow face of the heater through which the air flows into the heater is lower than a center of the air outflow face of the cooler.

5. The air conditioning unit according to claim 1, wherein the blower is a centrifugal blower or a mixed flow blower.

6. The air conditioning unit according to claim 1, further comprising a dividing member disposed downstream of the blower in the air flow direction and upstream of the heater in the air flow direction and configured to divide the upper bypass passage and the lower bypass passage,
wherein the heater is disposed within a predetermined area between an upper end and a lower end of the dividing member.

7. The air conditioning unit according to claim 1, wherein the heater has a size in an up-down direction to be concealed by the blower when the heater is viewed from the air outflow face of the cooler.

8. The air conditioning unit according to claim 1, wherein the first opening is a face opening that communicates with a face blow outlet through which the air is blown toward a face of an occupant in a vehicle interior.

9. The air conditioning unit according to claim 1, wherein the second opening is a foot opening that communicates with a foot blow outlet through which the air is blown toward a foot of an occupant in a vehicle interior.

* * * * *